United States Patent
Shimosugi (10) Patent No.: US 10,823,605 B2
(45) Date of Patent: Nov. 3, 2020

(54) METHOD OF EVALUATING PEN INPUT DEVICE FILM, APPARATUS FOR EVALUATING PEN INPUT DEVICE FILM, AND PEN INPUT DEVICE FILM

(71) Applicant: DAICEL CORPORATION, Osaka (JP)

(72) Inventor: Shota Shimosugi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 16/477,998

(22) PCT Filed: Oct. 10, 2017

(86) PCT No.: PCT/JP2017/036710
§ 371 (c)(1),
(2) Date: Jul. 15, 2019

(87) PCT Pub. No.: WO2018/146863
PCT Pub. Date: Aug. 16, 2018

(65) Prior Publication Data
US 2019/0346304 A1 Nov. 14, 2019

(30) Foreign Application Priority Data
Feb. 8, 2017 (JP) .................................. 2017-021154

(51) Int. Cl.
*G01H 17/00* (2006.01)
*G01P 15/08* (2006.01)
(Continued)

(52) U.S. Cl.
CPC .............. *G01H 17/00* (2013.01); *G01P 15/08* (2013.01); *G06F 3/03545* (2013.01); *G06F 3/041* (2013.01)

(58) Field of Classification Search
CPC .............................. G06F 3/016; G06F 3/03545
See application file for complete search history.

(56) References Cited

U.S. PATENT DOCUMENTS 5,627,348 A * 5/1997 Berkson .............. G06F 3/03545
178/19.02
5,902,968 A * 5/1999 Sato .................... G06F 3/03545
178/19.01
(Continued)

FOREIGN PATENT DOCUMENTS

EP 3 278 975 A1 2/2018
JP 11-212709 A 8/1999
(Continued)

OTHER PUBLICATIONS

International Preliminary Report on Patentability and the Written Opinion of the International Searching Authority for International Application No. PCT/JP2017/036710, dated Aug. 13, 2019.
(Continued)

*Primary Examiner* — Kevin M Nguyen
(74) *Attorney, Agent, or Firm* — Birch, Stewart, Kolasch & Birch, LLP (57) ABSTRACT

A method of evaluating a pen input device film includes: a first step of, while keeping a tip of a pen in contact with a surface of the pen input device film, moving the pen input device film relative to the pen along the surface of the pen input device film, and while the pen input device film is being moved relative to the pen, when the pen vibrates at a predetermined vibration frequency, obtaining measurement data that indicates at least one of an amplitude and an acceleration of the pen; and a second step of comparing the measurement data obtained in the first step with reference data.

16 Claims, 2 Drawing Sheets

(51) Int. Cl.
G06F 3/0354 (2013.01)
G06F 3/041 (2006.01)

(56) References Cited

U.S. PATENT DOCUMENTS

| | | | |
|---|---|---|---|
| 6,324,237 B1* | 11/2001 | Price | G01P 13/00 |
| | | | 377/8 |
| 2012/0026180 A1* | 2/2012 | Kuchenbecker | G06F 3/016 |
| | | | 345/582 |
| 2014/0333970 A1 | 11/2014 | Jinno | |
| 2017/0364167 A1* | 12/2017 | Ribeiro | G06F 3/016 |

FOREIGN PATENT DOCUMENTS

| | | | |
|---|---|---|---|
| JP | 2014-232277 A | 12/2014 |
| JP | 2014-239419 A | 12/2014 |
| JP | 2015-54417 A | 3/2015 |
| JP | 2016-196113 A | 11/2016 |

OTHER PUBLICATIONS

International Search Report for International Application No. PCT/JP2017/036710 dated Nov. 7, 2017.

\* cited by examiner

METHOD OF EVALUATING PEN INPUT DEVICE FILM, APPARATUS FOR EVALUATING PEN INPUT DEVICE FILM, AND PEN INPUT DEVICE FILM

TECHNICAL FIELD

The present invention relates to a method of evaluating a pen input device film, an apparatus for evaluating a pen input device film, and a pen input device film.

BACKGROUND ART

A pen input device that receives inputs from a stylus pen (a contactor) is equipped with a display surface. For example, a pen input device film is placed on the display surface. The pen input device film is required to realize an excellent feeling of writing. There are methods of evaluating the feeling of writing on the pen input device film, such as those disclosed by Patent Literature 1. For example, Patent Literature 1 discloses a sensory evaluation method in which the feeling of writing on the pen input device film is evaluated based on how an evaluator feels, and also discloses an evaluation method in which the feeling of writing on the pen input device film is evaluated based on the resistance force of the pen when the surface of the film is scanned with the tip of the pen.

CITATION LIST

Patent Literature

PTL 1: Japanese Laid-Open Patent Application Publication No. 2014-232277

SUMMARY OF INVENTION

Technical Problem

However, in the case of evaluating the feeling of writing on the pen input device film by sensory evaluation based on how the evaluator feels, there is a risk that the evaluation results vary since the evaluation made in this method is a subjective evaluation made by the evaluator. Also, in the case of evaluating the feeling of writing on the pen input device film based on the resistance force of the pen, it is often hard to make a proper evaluation, because evaluating the feeling of writing on the pen input device film based solely on the resistance force of the pen is difficult.

In view of the above, an objective of the present invention is making it possible to properly evaluate the feeling of writing on a pen input device film, and to provide a pen input device film having an excellent feeling of writing.

Solution to Problem

As a result of studies conducted by the inventors of the present invention, they have obtained the following findings: when a pen is moved on the surface of a pen input device film, the pen repeatedly gets caught on and gets out of fine irregularities formed on the surface of the pen input device film, and thereby vibrates; and the amplitude and the acceleration of the pen when the pen thus vibrates are correlated with the feeling of writing on the pen input device film. The inventors of the present invention have found that the closer the amplitude and the acceleration of the pen at the time are to the amplitude and the acceleration of the pen when an input is made with the pen on a pen input device film having a reference feeling of writing, the closer the feeling of writing on the pen input device film is to the feeling of writing on the reference pen input device film.

In order to solve the above-described problems, a method of evaluating a pen input device film according to one aspect of the present invention includes: a first step of, while keeping a tip of a pen in contact with a surface of the pen input device film, moving the pen input device film relative to the pen along the surface of the pen input device film, and while the pen input device film is being moved relative to the pen, when the pen vibrates at a predetermined vibration frequency, obtaining measurement data that indicates at least one of an amplitude and an acceleration of the pen; and a second step of comparing the measurement data obtained in the first step with reference data.

According to the above method, in the first step, while the pen and the pen input device film are being moved relative to each other as above, the pen repeatedly gets caught on and gets out of fine irregularities formed on the surface of the pen input device film, thereby vibrating at the predetermined vibration frequency, and at least one of the amplitude and the acceleration of the pen when the pen vibrates at the predetermined vibration frequency can be measured. In the second step, the measurement data indicating at least one of the amplitude and the acceleration of the pen measured in the first step is compared with, for example, the reference data of a film having a reference feeling of writing, and how close the values of the measurement data are to the values of the reference data is evaluated. In this manner, the feeling of writing on the pen input device film can be properly evaluated.

In the first step, the amplitude of the pen may be calculated by using a measurement value of the acceleration of the pen based on Math. 1:

$$S = 20 \times \log_{10}(a/1 \times 10^{-5}) \quad [\text{Math. 1}],$$

where S is the amplitude (in units of dB), and a is the acceleration (in units of m/s$^2$).

According to the above method, when the measurement data indicating the acceleration of the pen is obtained in the first step, the acceleration of the pen can be readily converted based on Math. 1 into the amplitude of the pen, which can be more intuitively understood by a person.

The vibration frequency may have a value within a range of greater than 0 Hz and not greater than 4 Hz. Thus, the measurement data at a vibration frequency having a value within the range of greater than 0 Hz and not greater than 4 Hz is compared with the reference data. In this manner, the measurement data at the vibration frequency at which the vibration is comfortably perceivable by a person can be compared with the reference data, and thereby the pen input device film having an excellent feeling of writing can be evaluated more properly.

In the first step, the pen input device film may be supported by a support body, and the pen input device film may be moved together with the support body relative to the pen.

According to the above method, since the pen input device film is supported by the support body, for example, the pen input device film can be readily moved together with the support body relative to the pen, and also, the pen can be brought into contact with the pen input device film while preventing deformation of the pen input device film. This makes it possible to readily evaluate the feeling of writing on the pen input device film.

In the first step, the acceleration may be measured by an acceleration detection sensor mounted to the pen. Accordingly, even if the vibration of the pen is fine vibration, the acceleration of the pen can be directly and readily measured by using the acceleration detection sensor.

An apparatus for evaluating a pen input device film according to another aspect of the present invention includes: a support body configured to support the pen input device film; a holder configured to hold a pen such that a tip of the pen is in contact with a surface of the pen input device film; a moving mechanism configured to, in a state where the pen input device film is supported by the support body, move the support body together with the pen input device film relative to the pen along the surface of the pen input device film; a measuring unit configured to measure at least one of an amplitude and an acceleration of the pen when the pen vibrates at a predetermined vibration frequency while the support body is being moved relative to the pen; and an output unit configured to output measurement data measured by the measuring unit.

The above configuration makes it possible to: move the pen input device film supported by the support body by the moving mechanism relative to the pen held by the holder; measure, by the measuring unit, at least one of the amplitude and the acceleration of the pen when the pen vibrates at the predetermined vibration frequency; and output the measurement data measured by the measuring unit by the output unit. Accordingly, for example, by comparing the measurement data outputted by the output unit with the reference data, the feeling of writing on the pen input device film can be evaluated properly while reducing the burden on an operator due to manual operations.

The measuring unit may calculate the amplitude of the pen by using a measurement value of the acceleration of the pen based on Math. 1:

$$S = 20 \times \log_{10}(a/1 \times 10^{-5})$$ [Math. 1], where S is the amplitude (in units of dB), and a is the acceleration (in units of m/s$^2$). In this manner, the acceleration of the pen can be readily converted into the amplitude of the pen, which can be more intuitively understood by a person.

The vibration frequency may have a value within a range of greater than 0 Hz and not greater than 4 Hz. Thus, the measurement data at a vibration frequency having a value within the range of greater than 0 Hz and not greater than 4 Hz is compared with the reference data. In this manner, the measurement data at the vibration frequency at which the vibration is comfortably perceivable by a person can be compared with the reference data, and thereby the pen input device film having an excellent feeling of writing can be evaluated more properly.

The measuring unit may include an acceleration detection sensor mounted to the pen. Accordingly, even if the vibration of the pen is fine vibration, the acceleration of the pen can be directly and readily measured by using the acceleration detection sensor.

A pen input device film according to yet another aspect of the present invention is disposed to cover a display surface of a pen input device, and the pen input device film is configured such that, while a pen is being in contact with a surface of the pen input device film, when the pen is moved relative to the surface along the surface, the pen vibrates at an amplitude whose maximum value is set to be not less than 90 dB and not greater than 110 dB. With this setting, the amplitude of the vibration of the pen when writing is performed with the pen on the pen input device film can be brought close to the amplitude of the vibration of the pen when writing is performed with the pen on a piece of paper, and thus the pen input device film having an excellent feeling of writing can be obtained.

The pen input device film may include: a first film member disposed to cover the display surface; and a second film member disposed to cover a surface of the first film member, the surface being positioned on an opposite side of the first film member from the display surface. The second film member may include: a base portion extending along the surface of the first film member, the surface being positioned on the opposite side of the first film member from the display surface; and a plurality of bead particles retained by the base portion such that the bead particles are dispersed from each other. Retention regions of the second film member retain the bead particles, and each retention region may protrude from a peripheral region thereof toward an opposite side from the first film member. A surface of the second film member, the surface being positioned on an opposite side of the second film member from the display surface, may have an arithmetic mean roughness Ra set to a value within a range of not less than 0.5 μm and not greater than 1.5 μm, and have a maximum height of rolling circle waviness profile $W_{EM}$ set to a value within a range of not less than 10.0 μm and not greater than 20.0 μm.

A pen input device film according to yet another aspect of the present invention includes: a first film member disposed to cover a display surface of a pen input device; and a second film member disposed to cover a surface of the first film member, the surface being positioned on an opposite side of the first film member from the display surface. The second film member includes: a base portion extending along the surface of the first film member, the surface being positioned on the opposite side of the first film member from the display surface; and a plurality of bead particles retained by the base portion such that the bead particles are dispersed from each other. A ratio of a weight M2 of the bead particles of the second film member to a weight M1 of the base portion of the second film member, i.e., ratio M2/M1, is set to a value within a range of not less than 0.002 and not greater than 0.1. Also, a ratio of a mean thickness D2 of the base portion to a mean particle diameter D1 of the bead particles, i.e., ratio D2/D1, is set to a value within a range of not less than 0.5 and not greater than 0.8. Retention regions of the second film member retain the bead particles, and each retention region protrudes from a peripheral region thereof toward an opposite side from the first film member.

According to the above configurations, while moving the pen relative to the pen input device film along the surface of the pen input device film, the pen repeatedly gets caught on and gets out of the retention regions of the second film member, and thus vibrates. Here, the ratio D2/D1 and the ratio M2/M1 are set to the aforementioned values, or the arithmetic mean roughness Ra and the maximum height of rolling circle waviness profile $W_{EM}$ of the surface of the second film member, the surface being positioned on the opposite side of the second film member from the display surface, are set to the aforementioned values. Owing to such settings, when an input is performed with the pen on the pen input device film, the vibration amplitude and the acceleration of the pen when the pen vibrates as a result of getting caught on and getting out of the retention regions are close to the vibration amplitude and the acceleration of the pen vibrating when writing is performed with the pen on a piece of paper, and consequently, the feeling of writing that is close to the feeling of writing on a piece of paper can be obtained. In this manner, the pen input device film having an excellent feeling of writing can be obtained.

The bead particles may have a mean particle diameter D1 set to a value within a range of not less than 8 μm and not greater than 30 μm. With this setting, the bead particles can be formed in such a size that the bead particles are not readily visible, but the transmission of the vibration from the pen to the hand of an inputter is suitably facilitated. Also, this setting makes it possible to prevent a situation where the visibility of the display surface of the pen input device is lowered due to the installation of the pen input device film.

The base portion and the bead particles may be made of a same material. Accordingly to this configuration, the pen input device film having an excellent feeling of writing can be obtained, and also, the difference between the base portion and the bead particles in terms of optical property can be reduced, thereby making it possible to impart favorable light permeability to the pen input device film.

The base portion may have a mean thickness D2 set to a value within a range of not less than 50 μm and not greater than 250 μm. Since the mean thickness D2 of the first film member is set to such a value, the bead particles can be favorably retained by the first film member, and also, the first film member capable of keeping favorable light permeability can be obtained.

The surface of the second film member, on which each of the retention regions protrudes from the peripheral region, may be an outermost surface positioned on the opposite side of the second film member from the display surface. This configuration makes it possible to obtain the pen input device film, which allows the vibration of the pen to be readily transmitted to the hand of the inputter.

Advantageous Effects of Invention

Each of the above aspects of the present invention makes it possible to properly evaluate the feeling of writing on a pen input device film, and to provide a pen input device film having an excellent feeling of writing.

DESCRIPTION OF EMBODIMENTS

Embodiment

Hereinafter, an embodiment of the present invention is described with reference to the drawings.

[Pen Input Device Film]

Figure 1:
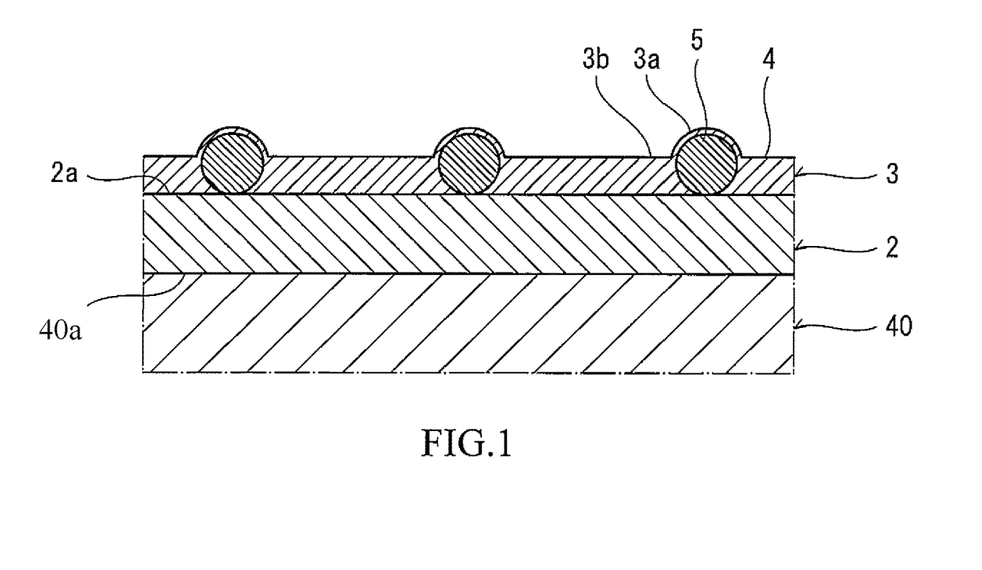
FIG. 1 is a schematic sectional view of a pen input device film according to an embodiment.

FIG. 1 is a schematic sectional view of a pen input device film 1 (which is hereinafter simply referred to as "film 1") according to the embodiment. The film 1 is a light-permeable film. Specifically, the haze of the film 1 of the present embodiment is set to a value within the range of not less than 5% and not greater than 60%. The total light transmittance of the film 1 is set to a value within the range of not less than 85% and not greater than 100%.

As shown in FIG. 1, the film 1 includes a first film member 2 and a second film member 3. The first film member 2 is disposed to cover a display surface 40a of a pen input device 40. As one example, the first film member 2 is laminated on the display surface 40a via an adhesive. The first film member 2 has a mean thickness D2 set to a value within the range of not less than 50 μm and not greater than 250 μm. The mean thickness herein is a value obtained by halving the sum of the maximum thickness and the minimum thickness of the first film member 2. However, the mean thickness D2 is not limited to such a value. Although the first film member 2 is made of PET in this example, the material of the first film member 2 is not limited to PET.

The second film member 3 is disposed to cover a surface (in this example, an upper surface 2a) of the first film member 2, the surface being positioned on the opposite side of the first film member 2 from the display surface 40a. The second film member 3 includes a base portion 4 and a plurality of bead particles 5. The base portion 4 extends along the aforementioned surface of the first film member 2, the surface being positioned on the opposite side of the first film member 2 from the display surface 40a. The plurality of bead particles 5 are retained by the base portion 4 such that the bead particles 5 are dispersed from each other.

Retention regions 3a of the second film member 3 retain the bead particles 5, and each retention region 3a protrudes from a peripheral region 3b thereof toward the opposite side from the first film member 2. In the second film member 3, a plurality of retention regions 3a are arranged in a dispersed manner, such that the retention regions 3a are positioned corresponding to the respective bead particles 5. As one example, in the retention regions 3a, the bead particles 5 are covered by the base portion 4. On a surface of the second film member 3, the surface being positioned on the opposite side of the second film member 3 from the first film member 2, the plurality of retention regions 3a and the peripheral regions 3b thereof are arranged in a manner to form irregularities on the surface.

In the present embodiment, the surface of the second film member 3, on which each of the retention regions 3a protrudes from the peripheral region 3b, is the outermost surface positioned on the opposite side of the second film member 3 from the display surface 40a. Accordingly, the second film member 3 comes into contact with the tip of a pen 6 (see FIG. 2). It should be noted that another film member may be disposed over the outer surface of the second film member 3. In addition, yet another film member may be disposed between the first film member 2 and the second film member 3.

The bead particles 5 have a mean particle diameter D1 set to a value within the range of not less than 8 μm and not greater than 30 μm. The mean particle diameter herein is a 50% volume mean particle diameter measured by the Coulter counter method.

Although the mean particle diameter D1 can be measured as a 50% volume mean particle diameter by the Coulter counter method as above, the mean particle diameter D1 can be measured from the film also by the following alternative method. In the alternative method, the film is embedded in epoxy resin or the like, from which cross sections are cut by a microtome or the like, and the obtained cross sections are observed by a TEM, thereby measuring the mean particle diameter D1. In this case, five samples are taken from random portions of the film, and the dimensions of about 100 bead particles 5 are measured for each sampled portion. In this manner, the mean particle diameter D1 can be measured. Since a particle diameter distribution is obtained through this process, the median value of the particle diameter distribution may be used as the "mean particle diameter D1".

The ratio of the weight M2 of the bead particles 5 of the second film member 3 to the weight M1 of the base portion 4 of the second film member 3, i.e., ratio M2/M1, is set to a value within the range of not less than 0.002 and not greater than 0.1. Also, the ratio of the mean thickness D2 of the base portion 4 to the mean particle diameter D1 of the bead particles 5, i.e., ratio D2/D1, is set to a value within the range of not less than 0.5 and not greater than 0.8. The mean thickness D2 is a value obtained by halving the sum of the maximum thickness and the minimum thickness of the base portion 4.

The surface of the second film member 3, the surface being positioned on the opposite side of the second film member 3 from the display surface 40a, has an arithmetic mean roughness Ra set to a value within the range of not less than 0.5 µm and not greater than 1.5 µm, and has a maximum height of rolling circle waviness profile $W_{EM}$ set to a value within the range of not less than 10.0 µm and not greater than 20.0 µm.

The base portion 4 and the bead particles 5 are made of the same material. The material of the base portion 4 and the bead particles 5 is, for example, an acrylate resin. Specifically, the base portion 4 and the bead particles 5 contain a multifunctional acrylate resin. The material of the base portion 4 and the bead particles 5 is not limited to the acrylate resin. Alternatively, the base portion 4 and the bead particles 5 may contain, for example, a urethane resin. As one example, the coefficient of dynamic friction between the pen 6 and the surface of the second film member 3, on which the retention regions 3a protrude, is set to a value within the range of not less than 0.05 and not greater than 0.30.

When performing an input on the film 1 with the pen 6, an inputter moves the pen 6 relative to the second film member 3 along the surface of the second film member 3, during which the pen 6 repeatedly gets caught on and gets out of the retention regions 3a, and thus vibrates. The vibration of the pen 6 is transmitted from the pen 6 to the hand of the inputter. This vibration is one of the factors making up the feeling of writing on the film 1, which is perceived by the inputter.

According to studies conducted by the inventors of the present invention, while the pen 6 is being moved relative to the pen input device film along the surface of the pen input device film, the feeling of writing on the pen input device film is correlated with the amplitude and the acceleration of the pen 6 when the pen 6 vibrates in contact with the surface of the pen input device film. The closer the amplitude and the acceleration of the pen 6 at the time are to the amplitude and the acceleration of the pen 6 when an input is made with the pen 6 on a reference film having a reference feeling of writing, the closer the feeling of writing on the pen input device film is to the feeling of writing on the reference film. In other words, the amplitude and the acceleration of the pen 6 when an input is made with the pen 6 on the pen input device film are important elements among those determining the feeling of writing on the pen input device film.

While performing an input with the pen 6 on the pen input device film, the pen 6 vibrates as a result of repeatedly getting caught on and getting out of the irregularities formed on the surface of the pen input device film, and the magnitudes of the amplitude and the acceleration of the pen 6 when the pen 6 vibrates vary depending on, for example, the shapes of the irregularities formed on the surface of the pen input device film.

The film 1 is configured based on these findings. As one example, the film 1 is configured such that the feeling of writing on the film 1 is close to the feeling of writing on a piece of paper. That is, a piece of paper is set as the reference film for the film 1.

Moreover, the film 1 is configured such that, while the pen 6 is being moved in contact with the surface of the film 1 relative to the film 1 along its surface, the maximum value of the amplitude of the pen 6 when the pen 6 vibrates due to the relative movement is set to a value not less than 90 dB and not greater than 110 dB. With this setting, the amplitude of the vibration of the pen 6 when writing is performed with the pen 6 on the film 1 can be brought close to the amplitude of the vibration of the pen 6 when writing is performed with the pen 6 on a piece of paper, and thus the film 1 having an excellent feeling of writing can be obtained.

Furthermore, the ratio D2/D1 and the ratio M2/M1 are set to the aforementioned values, or the arithmetic mean roughness Ra and the maximum height of rolling circle waviness profile $W_{EM}$ of the surface of the second film member 3, the surface being positioned on the opposite side of the second film member 3 from the display surface 40a, are set to the aforementioned values. Owing to such settings, the amplitude and the acceleration of the pen 6 when the pen 6 vibrates as a result of repeatedly getting caught on and getting out of the retention regions 3a are close to the amplitude and the acceleration of the pen 6 when writing is performed with the pen 6 on a piece of paper, and consequently, the feeling of writing that is close to the feeling of writing on a piece of paper can be obtained. In this manner, the film 1 having an excellent feeling of writing can be obtained.

The mean particle diameter D1 of the bead particles 5 is set to a value within the range of not less than 8 µm and not greater than 30 µm. With this setting, the bead particles 5 can be formed in such a size that the bead particles 5 are not readily visible, but the transmission of the vibration from the pen 6 to the hand of the inputter is suitably facilitated. Also, this setting makes it possible to prevent a situation where the visibility of the display surface 40a of the pen input device 40 is lowered due to the installation of the film 1.

Since the base portion 4 and the bead particles 5 are made of the same material, the film 1 having an excellent feeling of writing can be obtained, and also, the difference between the base portion 4 and the bead particles 5 in terms of optical property can be made small, thereby making it possible to impart favorable light permeability to the film 1.

Since the mean thickness D2 of the first film member 2 is set to a value within the range of not less than 50 µm and not greater than 250 µm, the bead particles 5 can be favorably retained by the first film member 2, and also, the first film member 2 capable of keeping favorable light permeability can be obtained. The surface of the second film member 3, on which each of the retention regions 3a protrudes from the peripheral region 3b, is the outermost surface positioned on the opposite side of the second film member 3 from the display surface 40a. This configuration makes it possible to obtain the film 1, which allows the vibration of the pen 6 to be readily transmitted to the hand of the inputter.

The coefficient of dynamic friction between the pen 6 and the surface of the second film member 3, on which each of the retention regions 3a protrudes from the peripheral region 3b, is set to a value within the range of not less than 0.05 and not greater than 0.30. With this setting, the dynamic frictional resistance between the pen 6 and the surface of the second film member 3, on which each of the retention regions 3a protrudes from the peripheral region 3b, when writing is performed with the pen 6 on the film 1 can be made substantially equivalent to the dynamic frictional resistance between the pen 6 and the surface of a piece of paper when writing is performed with the pen 6 on the piece of paper, and thus the feeling of writing on the film 1 can be further improved.

The haze of the film 1 is set to a value within the range of not less than 5% and not greater than 60%, and the total light transmittance of the film 1 is set to a value within the range of not less than 85% and not greater than 100%. These settings make it possible to impart excellent light permeability to the film 1. Further, the base portion 4 contains a multifunctional acrylate resin. This makes it possible to obtain the second film member 3 having excellent light permeability, hardness, and functionality.

[Apparatus for Evaluating Pen Input Device Film]

Figure 2:
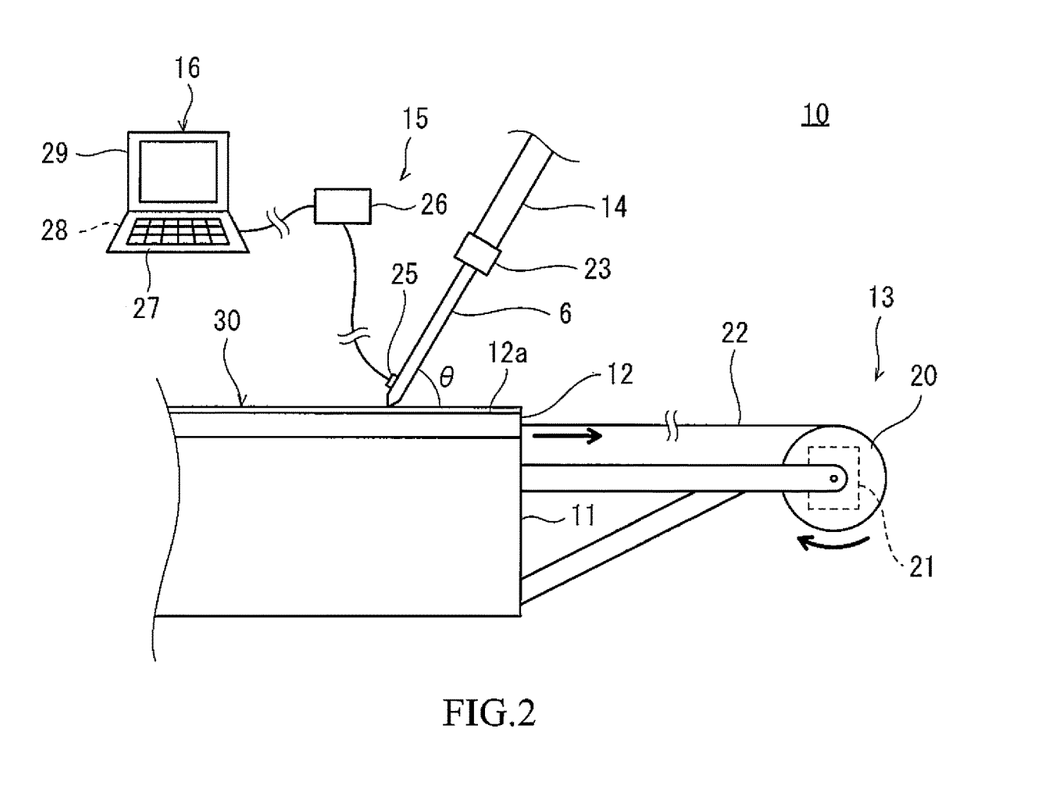
FIG. 2 is a schematic external view of an apparatus for evaluating the pen input device film according to the embodiment.

FIG. 2 is a schematic sectional view of an apparatus 10 for evaluating the pen input device film (hereinafter, simply referred to as "evaluation apparatus 10") according to the embodiment. As shown in FIG. 2, the evaluation apparatus 10 includes a base 11, a support body 12, a moving mechanism 13, a holder 14, a measuring unit 15, a controller 16, and the pen 6.

The base 11 is the lower part of the evaluation apparatus 10, and supports the support body 12. The support body 12 supports a pen input device film 30 (hereinafter, simply referred to as "film 30"), which is an evaluation target. In this example, a plate member serves as the support body 12, which is supported by the base 11 such that the support body 12 is slidable in one direction along its plate surface. The support body 12 includes a supporting surface 12a for fixedly supporting the film 30. As one example, the supporting surface 12a is the top surface of the support body 12. The supporting surface 12a is provided with an adhesive sheet for fixedly supporting the film 30. The adhesive sheet is affixed to the entire surface of the film 30. The method of fixedly supporting the film 30 on the supporting surface 12a is not particularly limited.

In a state where the film 30 is supported by the support body 12, the moving mechanism 13 moves the support body 12 together with the film 30 relative to the pen 6 along the surface of the film 30. The moving mechanism 13 includes a roller 20, a motor 21, and a wire 22. The shaft of the roller 20 is supported by the base 11 via an arm unit, such that the roller 20 is rotatable about the shaft at a position spaced apart from the support body 12. The motor shaft of the motor 21 is coupled to the roller 20, such that the driving force of the motor 21 is transmittable to the roller 20. The motor 21 is controlled by the controller 16. One end of the wire 22 is connected to the support body 12, and the other end of the wire 22 is connected to the roller 20.

When the motor 21 is driven, the driving force of the motor 21 causes the roller 20 to rotate in the circumferential direction toward one side, and as a result, the wire 22 is wound around the peripheral surface of the roller 20. While the wire 22 is being wound around the peripheral surface of the roller 20, the support body 12 is moved together with the film 30 in one direction (in this example, a direction toward the roller 20) over a particular distance. It should be noted that the evaluation apparatus 10 may further include a mechanism for bringing the support body 12 back to its original position at a predetermined timing after the support body 12 has moved over the particular distance.

The holder 14 holds the pen 6 such that the tip of the pen 6 is in contact with the surface of the film 30. The holder 14 is disposed above the support body 12, and is supported by the base 11 via an unshown arm unit. A weight 23 having a predetermined weight is attached to the rear part of the pen 6. As a result of the weight 23 being thus attached, the tip of the pen 6 is pressed against the upper surface of the film 30 with a pressing pressure (pen pressure) corresponding to the weight of the weight 23.

In a state where the support body 12 is stationary, when seen in the axial direction of the roller 20, the holder 14 holds the pen 6 such that an angle θ formed between the pen 6 and the film 30 on the one direction side has a predetermined value (e.g., a value within the range of not less than 45° and not greater than 60°). In the evaluation apparatus 10, by using the support body 12, the moving mechanism 13, and the holder 14, the film 30 is moved relative to the pen 6 along the surface of the film 30 in a state where the pen 6 is in contact with the film 30. While the film 30 is being thus moved, the tip of the pen 6 repeatedly gets caught on and gets out of the fine irregularities formed on the surface of the film 30, and thereby the pen 6 vibrates. When the pen 6 vibrates, the angle θ fluctuates slightly.

While the film 30 is being thus moved, the measuring unit 15 measures at least one of the amplitude and the acceleration of the pen 6 (in this example, both the amplitude and the acceleration of the pen 6) when the pen 6 vibrates at a predetermined vibration frequency. As one example, the measuring unit 15 includes an acceleration detection sensor 25 and an analyzer 26.

The acceleration detection sensor 25 is mounted to the pen 6, and detects the acceleration of the pen 6. The acceleration detection sensor 25 obtains the amount of vibration of the pen 6 as an electrical signal proportional to the acceleration of the pen 6. The acceleration detection sensor 25 is wire-connected to the analyzer 26. The analyzer 26 amplifies the electrical signal obtained by the acceleration detection sensor 25, and also calculates measurement data indicating at least one of the amplitude and the acceleration of the pen 6 (in this example, both the amplitude and the acceleration of the pen 6) when the pen 6 vibrates (hereinafter, the measurement data indicating at least one of the amplitude and the acceleration of the pen 6 may be simply referred to as "measurement data"). In the present embodiment, the analyzer 26 calculates the amplitude of the pen 6 by using a measurement value of the acceleration of the pen 6 based on Math. 1 shown below.

$$S = 20 \times \log_{10}(a/1 \times 10^{-5}) \qquad \text{[Math. 1]}$$

Where S is the amplitude (in units of dB) of the pen 6, and a is the acceleration (in units of m/s$^2$) of the pen 6.

The controller 16 controls the moving mechanism 13, and receives the measurement data from the measuring unit 15. The controller 16 is wire-connected to the moving mechanism 13 and the analyzer 26. The controller 16 includes an input unit 27, a control unit 28, and an output unit 29. The input unit 27 is a keyboard, for example. The input unit 27 receives setting information from an operator.

As one example, the controller 16 is a computer with a CPU, RAM, and ROM incorporated therein. The control unit 28 includes the CPU. The control unit 28 controls the moving mechanism 13 based on a control program stored in the ROM. The output unit 29 outputs the measurement data measured by the measuring unit 15. As one example, the output unit 29 is, but not limited to, a liquid crystal display The measurement data outputted by the output unit 29 is compared with predetermined reference data by an evaluator. The reference data is the measurement data that is obtained in a case where a reference film serving as an evaluation reference is used as the film 30. Specifically, in the present embodiment, the reference data is the measurement data that indicates the amplitude and the acceleration of the pen 6 and that is obtained in a case where the reference film (e.g., a piece of paper) serving as an evaluation reference is used as the film 30. Examples of the reference film herein include a resin film and also other wide variety of sheet-shaped members.

As one example, the tip of the pen 6 is curved from the rear end side toward the front end side of the pen 6, such that the tip of the pen 6 has a parabolic shape. The tip of the pen 6 is made of polyacetal (POM), for example. The material of the tip of the pen 6 is not limited to polyacetal (POM), but may be polyethylene (PE) or a metal, for example.

[Method of Evaluating Pen Input Device Film]

Hereinafter, a method of evaluating the pen input device film (hereinafter, simply referred to as "evaluation method") is described. The evaluation method includes a first step and a second step. In the first step, in a state where the tip of the pen 6 is in contact with the surface of the film 30, the film 30 is moved relative to the pen 6 along the surface of the film 30. While the film 30 is being thus moved, measurement data indicating at least one of the amplitude and the acceleration of the pen 6 (in this example, both the amplitude and the acceleration of the pen 6) when the pen 6 vibrates at a predetermined vibration frequency is obtained. In the second step, the measurement data obtained in the first step is compared with the reference data. As one example, the evaluation apparatus 10 is used in the evaluation method.

As shown in FIG. 2, in the first step, specifically, an operator disposes the support body 12 immediately over the base 11, places the film 30 on the supporting surface 12a of the support body 12, and fixes the film 30 to the supporting surface 12a by the adhesive sheet.

The operator uses the holder 14 to hold the pen 6, and attaches the weight 23 to the rear part of the pen 6, thereby pressing the tip of the pen 6 against the surface of the film 30. The operator instructs the controller 16 via the input unit 27 to start operating the evaluation apparatus 10.

Based on the control program, the control unit 28 of the controller 16 drives the motor 21 by a predetermined rotation amount to rotate the roller 20 in the aforementioned one direction. In the present embodiment, the control unit 28 rotates the roller 20 in the one direction at a constant speed. As a result, the film 30 is moved relative to the pen 6 along the surface of the film 30 over a particular distance (e.g., 100 mm) at a constant speed.

While the film 30 is being thus moved at the constant speed, the measuring unit 15 measures, as one example, the amplitude and the acceleration of the pen 6 when the pen 6 vibrates at a vibration frequency within a predetermined frequency range. The measurement data calculated by the analyzer 26 based on detection signals from the acceleration detection sensor 25 is transmitted to the controller 16. The control unit 28 stores the received measurement data in the RAM.

Of the measurement data stored in the RAM, the control unit 28 causes the output unit 29 to output the measurement data that indicates the amplitude and the acceleration of the pen 6 when the pen 6 vibrates at a vibration frequency within the range of greater than 0 Hz and not greater than 4 Hz.

In the second step, an evaluator compares the measurement data outputted by the output unit 29 with the reference data. As one example, the evaluator compares the measurement data at a vibration frequency of 2.5 Hz with the reference data. The evaluator evaluates the feeling of writing on the film 30 by checking how close the values of the measurement data are to the values of the reference data.

In the present embodiment, the output unit 29 outputs the measurement data that indicates both the amplitude and the acceleration of the pen 6. However, as an alternative, the output unit 29 may output the measurement data that indicates only one of the amplitude and the acceleration of the pen 6. The output unit 29 may output the measurement data together with the reference data.

As described above, according to the evaluation method of the present embodiment, in the first step, while the pen 6 and the film 30 are being moved relative to each other as above, the pen 6 repeatedly gets caught on and gets out of the fine irregularities formed on the surface of the film 30, thereby vibrating at a predetermined vibration frequency, and at least one of the amplitude and the acceleration of the pen 6 when the pen 6 vibrates at the predetermined vibration frequency can be measured. In the second step, the measurement data indicating at least one of the amplitude and the acceleration of the pen 6 measured in the first step is compared with, for example, the reference data of a film having a reference feeling of writing, and how close the values of the measurement data are to the values of the reference data is evaluated. In this manner, the feeling of writing on the film 30 can be properly evaluated. Thus, according to the evaluation method of the present embodiment, the vibration sensation felt when performing an input on the film 30 can be converted into numerical values. The conversion of the vibration sensation into numerical values makes it possible to evaluate the feeling of writing on the film 30 objectively and clearly.

Moreover, the use of the evaluation apparatus 10 makes it possible to: move the film 30 supported by the support body 12 by the moving mechanism 13 relative to the pen 6 held by the holder 14; measure, by the measuring unit 15, at least one of the amplitude and the acceleration of the pen 6 when the pen 6 vibrates at the predetermined vibration frequency; and output the measurement data measured by the measuring unit 15 by the output unit 29. Accordingly, by comparing the measurement data outputted by the output unit 29 with the reference data, the feeling of writing on the film 30 can be evaluated properly while reducing the burden on the evaluator or the operator due to manual operations.

In the first step, the amplitude of the pen 6 is calculated based on Math. 1 by using the measurement value of the acceleration of the pen 6. Accordingly, when the measurement data indicating the acceleration of the pen 6 is obtained in the first step, the acceleration of the pen 6 can be readily converted into the amplitude of the pen 6, which can be more intuitively understood by a person.

The measurement data at a vibration frequency having a value within the range of greater than 0 Hz and not greater than 4 Hz is compared with the reference data. In this manner, the measurement data at the vibration frequency at which the vibration is comfortably perceivable by a person can be compared with the reference data, and thereby the film 30 having an excellent feeling of writing can be evaluated more properly.

Since the film 30 is supported by the support body 12, for example, the film 30 can be readily moved together with the support body 12 relative to the pen 6, and also, the pen can be brought into contact with the film 30 while preventing deformation of the film 30. This makes it possible to readily evaluate the feeling of writing on the film 30.

In the first step, the acceleration of the pen 6 is detected by the acceleration detection sensor 25 mounted to the pen 6. Accordingly, even if the vibration of the pen 6 is fine vibration, the acceleration of the pen 6 can be directly and readily measured by using the acceleration detection sensor 25.

The tip of the pen 6 is made of polyacetal, which allows the tip of the pen 6 to have high wear resistance. Accordingly, changes in the feeling of writing on the film 30 due to wear of the pen 6 can be suppressed, which makes it possible to perform stable evaluation of the feeling of writing on the film 30.

It should be noted that the analyzer 26 may further include another output unit separately from the output unit 29 of the controller 16. In this case, the analyzer 26 can output the measurement data by this other output unit. The controller 16 may double as the analyzer 26. In this case, for example, the control unit 28 can measure the measurement data.

(Validation Test)

A piece of paper ("Campus Note" available from KOKUYO CO., LTD.) was set as the reference film. A film 1 with the following settings was prepared as Example 1: the mean particle diameter of the bead particles 5 was set to 15 μm; the ratio D2/D1 was set to 0.70; the ratio M2/M1 was set to 0.10; and the haze was set to 40%. Another film 1 with the same settings as those of Example 1, except for the ratio M2/M1 being set to 0.012 and the haze being set to 15%, was prepared as Example 2.

Two types of commercially available films were prepared as Comparative Examples 1 and 2. Comparative Examples 1 and 2 have substantially the same haze values as those of Examples 1 and 2, respectively, and each of the films of Comparative Examples 1 and 2 includes a hard coating layer not containing bead particles having a particle diameter of 8 μm or greater, the hard coating layer being formed on a contact surface coming into contact with the pen 6.

The evaluation apparatus 10 including the pen 6 was prepared, in which the tip of the pen 6 was made of polyacetal and the tip diameter was 1.4 mm. The weight of the weight 23 was set to 200 g; the relative speed between the support body 12 and the pen 6 (i.e., the writing speed with the pen 6) was set to 50 mm/s; the angle θ was set to 60°; and the constant-speed moving distance of the support body 12 was set to 100 mm. The evaluation apparatus 10 was operated such that each of the films of Examples 1, 2 and Comparative Examples 1, 2 was moved relative to the pen 6 at a constant speed. Then, the amplitude and the acceleration of the pen 6 when the pen 6 vibrated on each of the films of Examples 1, 2 and Comparative Examples 1, 2 were measured. The test results are shown in FIGS. 3 and 4.

Figure 3:
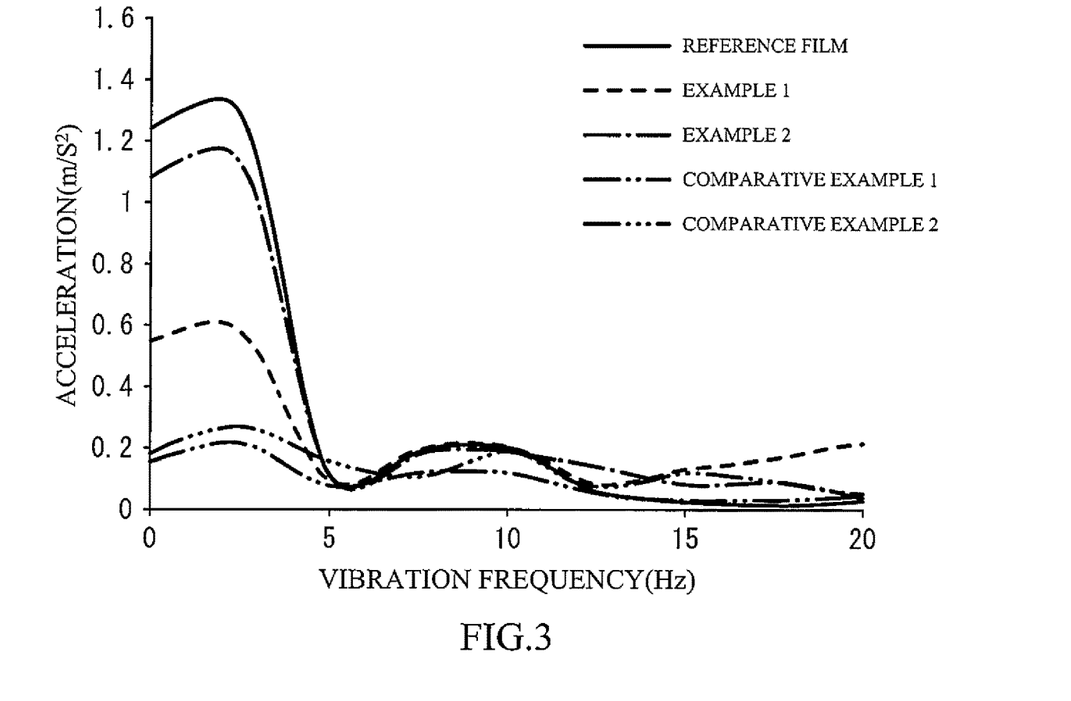
FIG. 3 is a graph showing a relationship between the vibration frequency of a pen and the acceleration of the pen when an input was performed with the pen on each of films of Examples 1, 2 and Comparative Examples 1, 2.

FIG. 3 is a graph showing a relationship between the vibration frequency of the pen 6 and the acceleration of the pen 6 when an input was performed with the pen 6 on each of the films of Examples 1, 2 and Comparative Examples 1, 2. FIG. 4 is a graph showing a relationship between the vibration frequency of the pen 6 and the amplitude of the pen 6 when an input was performed with the pen 6 on each of the films of Examples 1, 2 and Comparative Examples 1, 2. In each of FIGS. 3 and 4, the curve of the reference film corresponds to the reference data, and the curves of Examples 1, 2 and Comparative Examples 1, 2 correspond to the measurement data. The evaluation of the feeling of writing on each of the films of Examples 1, 2 and Comparative Examples 1, 2 can be made by evaluating how close the curves of Examples 1, 2 and Comparative Examples 1, 2 are to the curve of the reference film (specifically, how close they are to the curve of the reference film in terms of, for example, the position and the shape of the curve).

Figure 4:
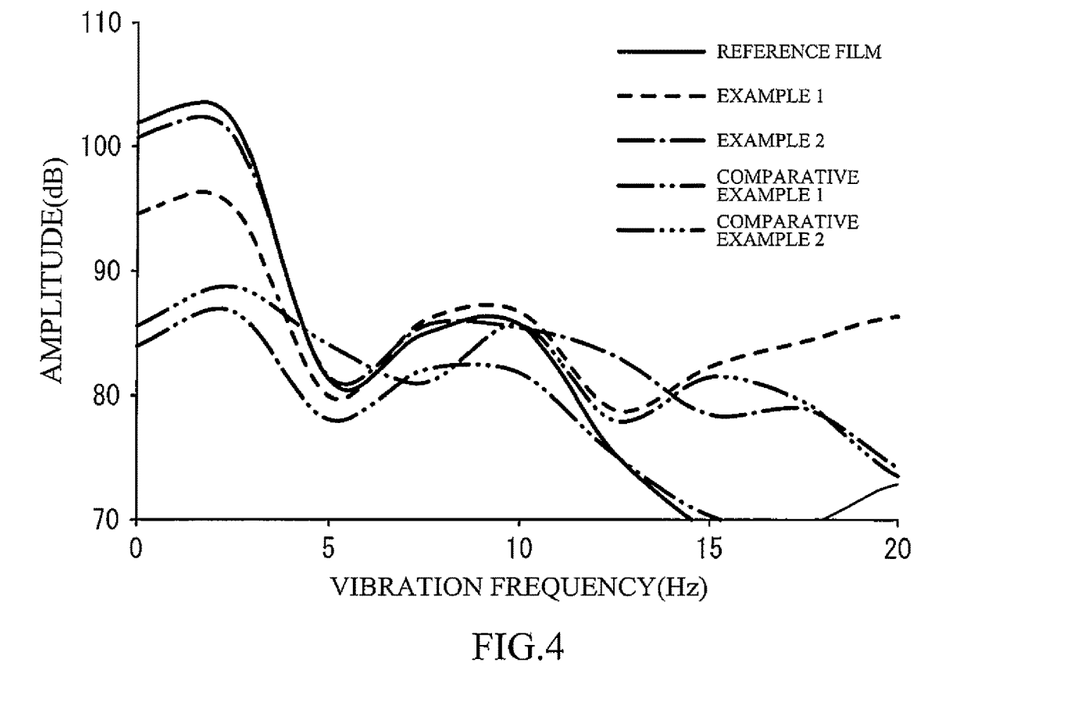
FIG. 4 is a graph showing a relationship between the vibration frequency of the pen and the amplitude of the pen when an input was performed with the pen on each of the films of Examples 1, 2 and Comparative Examples 1, 2.

It has been found from FIGS. 3 and 4 that when the vibration frequency of the pen 6 is within the range of greater than 0 Hz and not greater than 4 Hz, the amplitude and the acceleration of the pen 6 in Examples 1 and 2 are closer to the amplitude and the acceleration of the pen 6 on the reference film than the amplitude and the acceleration of the pen 6 in Comparative Examples 1 and 2. The reason for this is considered that, in each of the films of Examples 1 and 2, the ratio D2/D1 and the ratio M2/M1 of the second film member 3 are suitably set, and the shape of the outer surface of the second film member 3 is close to the shape of the outer surface of the reference film.

In particular, it has been found that the amplitude and the acceleration of the pen 6 in Example 2 are significantly close to the amplitude and the acceleration of the pen 6 on the reference film. The reason for this is considered as follows: in Example 2, the plurality of bead particles 5 arranged in the second film member 3 are more sparsely dispersed than in Example 1; as a result, in Example 2, the tip of the pen 6 has more tendency to get caught on and get out of the irregularities formed on the surface of the second film member 3; and consequently, the amplitude and the acceleration of the pen 6 in Example 2 are closer to the amplitude and the acceleration of the pen 6 on the reference film than the amplitude and the acceleration of the pen 6 in Example 1.

It should be noted that the inventors of the present invention also conducted other validation tests, in which an input with the pen 6 was performed on the reference film and on each of the films of Examples 1, 2 and Comparative Examples 1, 2 under the same conditions. It has been found from the validation tests that the feeling of writing on each of the films of Examples 1, 2 is closer to the feeling of writing on the reference film than the feeling of writing on each of the films of Comparative Examples 1 and 2. In particular, it has been found that the feeling of writing on the film of Example 2 is the closest to the feeling of writing on the reference film. It has been confirmed from these validation test results that the feeling of writing on a pen input device film can be properly evaluated based on the amplitude and the acceleration of the pen 6 when an input is performed with the pen 6 on the pen input device film.

Next, in each of Examples 1, 2 and Comparative Examples 1, 2, the arithmetic mean roughness Ra and the maximum height of rolling circle waviness profile $W_{EM}$ of the surface of a film member contacted by the pen 6 (in Examples 1 and 2, the surface of the second film member 3, the surface being positioned on the opposite side of the second film member 3 from the display surface 40a) were measured.

The arithmetic mean roughness Ra was measured in conformity with JIS B0601 by using a surface roughness/shape measuring instrument "Surfcom 570A" available from TOKYO SEIMITSU CO., LTD. The maximum height of rolling circle waviness profile was measured in conformity with JIS B0610 by using the above same measuring instrument under the conditions indicated below.

Measuring stylus: waviness stylus (0102505)
Specifications of the measuring stylus: 800 μmR, ruby
Driving speed: 3 mm/s
λf reduction cut-off value: 8 mm
Measuring length: 15 mm
The measurement results are shown in Table 1.

TABLE 1

|  | Arithmetic mean roughness Ra (μm) | Maximum height of rolling circle waviness profile $W_{EM}$ (μm) |
| --- | --- | --- |
| Example 1 | 1.1 | 10.0 |
| Example 2 | 0.6 | 10.3 |
| Comparative Example 1 | 0.2 | 10.6 |
| Comparative Example 2 | 0.4 | 5.7 |

As shown in Table 1, it has been found that the arithmetic mean roughness Ra is greater in Examples 1 and 2 than in Comparative Examples 1 and 2, and in particular, the arithmetic mean roughness Ra of Example 1 is significantly greater than the arithmetic mean roughness Ra of each of Comparative Examples 1 and 2. It has also been found that the maximum height of rolling circle waviness profile $W_{EM}$ of each of Examples 1 and 2 is greater than that of Comparative Example 2, but is less than that of Comparative Example 1. Based on these results, it has been confirmed that irregularities of a sufficient size and sufficient roughness are stably formed on the surface of the second film member 3 in each of Examples 1 and 2, the surface being positioned on the opposite side of the second film member 3 from the display surface 40*a*.

Based on these measurement results and other results of measurement conducted by the inventors of the present invention, it is considered that, in order to obtain a feeling of writing that is close to the feeling of writing on the reference film, the surface of the second film member 3, the surface being positioned on the opposite side of the second film member 3 from the display surface 40*a*, is desirably configured such that: the arithmetic mean roughness Ra of the surface is set to a value within the range of not less than 0.5 μm and not greater than 1.5 μm; and the maximum height of rolling circle waviness profile $W_{EM}$ of the surface is set to a value within the range of not less than 10.0 μm and not greater than 20.0 μm.

The present invention is not limited to the above-described embodiment, and modifications, additions, or deletions can be made to the above-described configuration and method without departing from the spirit of the present invention. In the above-described evaluation method and evaluation apparatus of the present invention, the pen 6 is disposed at a fixed position, and the film 30 is moved relative to the pen 6. However, conversely, the film 30 may be disposed at a fixed position, and the pen 6 may be moved relative to the film 30. Further alternatively, both the film 30 and the pen 6 may be moved relative to each other in the opposite directions.

INDUSTRIAL APPLICABILITY

The present invention makes it possible to evaluate the feeling of writing on a pen input device film more properly than conventional evaluation methods, and has an advantageous effect of being able to provide a pen input device film having an excellent feeling of writing. Therefore, the present invention is useful when widely applied as a method of evaluating a pen input device film, an apparatus for evaluating a pen input device film, and a pen input device film that make it possible to exert the above advantageous effect meaningfully.

REFERENCE SIGNS LIST

1, 30 pen input device film
2 first film member
3 second film member
3*a* retention region
3*b* peripheral region
4 base portion
5 bead particle
6 pen
10 apparatus for evaluating the pen input device film
12 support body
13 moving mechanism
14 holder
15 measuring unit
29 output unit
40*a* display surface

The invention claimed is:

1. A method of evaluating a pen input device film, the method comprising:
   a first step of, while keeping a tip of a pen in contact with a surface of the pen input device film, moving the pen input device film relative to the pen along the surface of the pen input device film, and while the pen input device film is being moved relative to the pen, when the pen vibrates at a predetermined vibration frequency, obtaining measurement data that indicates at least one of an amplitude and an acceleration of the pen; and
   a second step of comparing the measurement data obtained in the first step with reference data, wherein
   in the first step, the amplitude of the pen is calculated by using a measurement value of the acceleration of the pen based on Math. 1:

$$S = 20 \times \log_{10}(a/1 \times 10^{-5}) \qquad [\text{Math. 1}],$$

where S is the amplitude (in units of dB), and a is the acceleration (in units of m/s²).

2. The method of evaluating a pen input device film according to claim 1, wherein
   the vibration frequency has a value within a range of greater than 0 Hz and less than or equal to 4 Hz.

3. The method of evaluating a pen input device film according to claim 1, wherein
   in the first step, the pen input device film is supported by a support body, and the pen input device film is moved together with the support body relative to the pen.

4. The method of evaluating a pen input device film according to claim 1, wherein
   in the first step, the acceleration is measured by an acceleration detection sensor mounted to the pen.

5. An apparatus for evaluating a pen input device film, comprising:
   a support body configured to support the pen input device film;
   a holder configured to hold a pen such that a tip of the pen is in contact with a surface of the pen input device film;
   a moving mechanism configured to, in a state where the pen input device film is supported by the support body, move the support body together with the pen input device film relative to the pen along the surface of the pen input device film;

an analyzer configured to measure an amplitude of the pen when the pen vibrates at a predetermined vibration frequency while the support body is being moved relative to the pen; and an acceleration detection sensor configured to measure an acceleration of the pen when the pen vibrates at the predetermined vibration frequency while the support body is being moved relative to the pen, wherein the analyzer calculates the amplitude of the pen by using a measurement value of the acceleration of the pen based on Math. 1:

$$S=20\times\log_{10}(a/1\times10^{-5}) \quad \text{[Math. 1]},$$

where S is the amplitude (in units of dB), and a is the acceleration (in units of m/s²).

6. The apparatus for evaluating a pen input device film according to claim 5, wherein
the vibration frequency has a value within a range of greater than 0 Hz and less than or equal to 4 Hz.

7. The apparatus for evaluating a pen input device film according to claim 5, wherein
the acceleration detection sensor is mounted to the pen.

8. A pen input device film disposed to cover a display surface of a pen input device, the pen input device film being configured such that,
while a pen is being in contact with a surface of the pen input device film, when the pen is moved relative to the surface along the surface, the pen vibrates at an amplitude whose maximum value is set to be greater than or equal to 90 dB and less than or equal to 110 dB.

9. The pen input device film according to claim 8, comprising:
a first film member disposed to cover the display surface; and
a second film member disposed to cover a surface of the first film member, the surface being positioned on an opposite side of the first film member from the display surface, wherein
the second film member includes:
a base portion extending along the surface of the first film member, the surface being positioned on the opposite side of the first film member from the display surface; and
a plurality of bead particles retained by the base portion such that the bead particles are dispersed from each other,
retention regions of the second film member retain the bead particles, and each retention region protrudes from a peripheral region thereof toward an opposite side from the first film member, and
a surface of the second film member, the surface being positioned on an opposite side of the second film member from the display surface, has an arithmetic mean roughness Ra set to a value within a range of greater than or equal to 0.5 μm and less than or equal to 1.5 μm, and has a maximum height of rolling circle waviness profile $W_{EM}$ set to a value within a range of greater than or equal to 10.0 μm and less than or equal to 20.0 μm.

10. The pen input device film according to claim 9, wherein
the bead particles have a mean particle diameter D1 set to a value within a range of greater than or equal to 8 μm and less than or equal to 30 μm.

11. The pen input device film according to claim 9, wherein
the base portion and the bead particles are made of a same material.

12. The pen input device film according to claim 9, wherein
the base portion has a mean thickness D2 set to a value within a range of greater than or equal to 50 μm and less than or equal to 250 μm.

13. The pen input device film according to claim 9, wherein
the surface of the second film member, on which each of the retention regions protrudes from the peripheral region, is an outermost surface positioned on the opposite side of the second film member from the display surface.

14. The pen input device film according to claim 8, wherein
the surface of the pen input device film has an arithmetic mean roughness Ra set to a value within a range of greater than or equal to 0.5 μm and less than or equal to 1.5 μm and has a maximum height of rolling circle waviness profile $W_{EM}$ set to a value within a range of greater than or equal to 10.0 μm and less than or equal to 20.0 μm.

15. A pen input device comprising a surface on which an input is performed with a pen, wherein
while the pen is being in contact with the surface of the pen input device, when the pen is moved relative to the surface along the surface, the pen vibrates at an amplitude whose maximum value is set to be greater than or equal to 90 dB and less than or equal to 110 dB.

16. The pen input device according to claim 15, wherein the surface of the pen input device has an arithmetic mean roughness Ra set to a value within a range of greater than or equal to 0.5 μm and less than or equal 1.5 μm, and has a maximum height of rolling circle waviness profile $W_{EM}$ set to a value within a range of greater than or equal to 10.0 μm and less than or equal to 20.0 μm.

* * * * *